Figure 1:
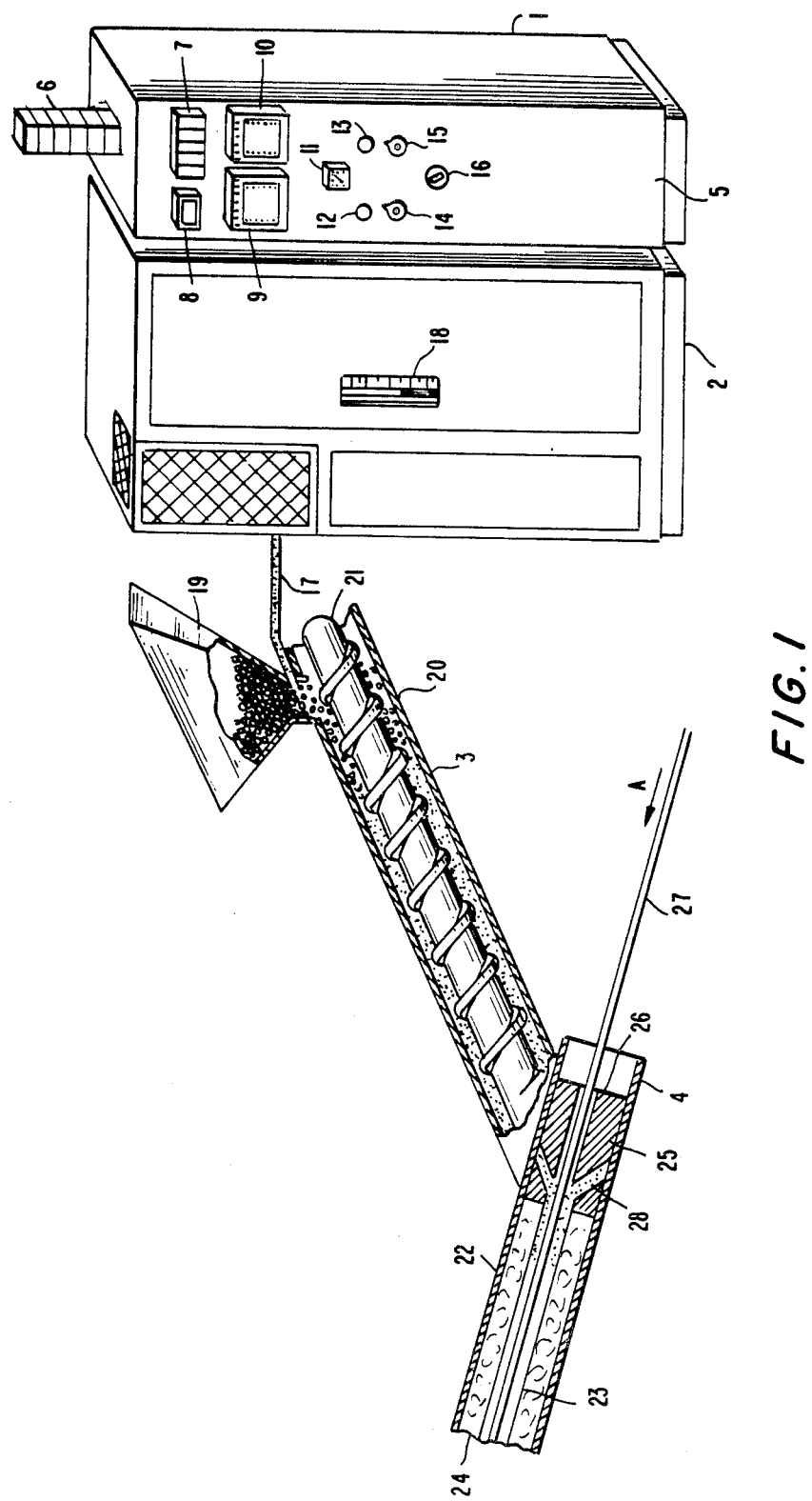

United States Patent [19] [11] 4,243,773
Arnaud et al. [45] Jan. 6, 1981

[54] VOLATILE LIQUID SUPPLY EQUIPMENT AND PROCESSES AND APPARATUS FOR INTRODUCING VOLATILE CROSS-LINKING AGENTS INTO POLYOLEFIN COMPOUNDS AND FOR THE EXTRUSION OF CROSS-LINKING POLYOLEFIN COMPOUNDS

[75] Inventors: Claude J. Arnaud, Riom; Jean M. Quemner, Clermont-Ferrand; Gaston P. Roche, Riom, all of France

[73] Assignee: Societe Anonyme de Telecommunications, Paris, France

[21] Appl. No.: 50,789

[22] Filed: Jun. 21, 1979

Related U.S. Application Data

[62] Division of Ser. No. 851,953, Nov. 16, 1977, Pat. No. 4,198,374.

[30] Foreign Application Priority Data

Jan. 17, 1975 [FR] France ................................. 75 01432

[51] Int. Cl.$^3$ ............................. C08F 8/06; C08F 8/08; C08C 19/04
[52] U.S. Cl. ............................... 525/387; 260/45.95 F
[58] Field of Search .................... 525/387; 260/45.95 F

[56] References Cited

U.S. PATENT DOCUMENTS

| | | | |
|---|---|---|---|
| 2,528,523 | 11/1953 | Kent | 525/387 |
| 3,923,947 | 12/1975 | Cook | 525/387 |
| 3,940,379 | 2/1976 | Castagna et al. | 525/387 |
| 4,006,283 | 2/1977 | MacKenzie et al. | 525/387 |

Primary Examiner—William F. Hamrock
Attorney, Agent, or Firm—James C. Jangarathis

[57] ABSTRACT

In accordance with an exemplary embodiment of the instant invention, a volatile cross-linking agent such as liquid peroxide is introduced, at ambient temperature and under atmospheric pressure directly into the input of an extruder at the same pressure as a polyolefin compound to be cross-linked. The resulting compounds are put under pressure within the extruder as the temperature increases so that the mixture reaches its definitive shape at the extruder output and may be fed directly into a hot cross-linking enclosure which is maintained under pressure. The peroxide is thus incorporated in a single operation permitting complete control of the ingredients mixed and allowing perfect homogenization of the mixture while defusion and consequent loss of the highly volatile peroxide are avoided. The system for introducing the highly volatile cross-linking agent includes a peroxide storage tank, a filling pump, a feed vessel, an incremental feed pump with a pressure meter, a flow meter and numerous safety features. These elements control the flow, temperature and ambient conditions of the cross-linking agent feed system within a controlled environment to ensure the safe and precise handling of a highly volatile liquid while at the same time controlling the feeding of the liquid as a function of the material processed by the extruder so that the percentage of the cross-linking agent inserted at the input to the extruder remains at a constant, predetermined percentage, regardless of extruder speed variations. Additionally, various additives which are soluble in the volatile cross-linking agent may be introduced within the feed system therefor in sufficient amounts for effecting protection of the resulting polymer without altering the efficiency of the feed system or that of the additive so that the entire process may be carried out at the processing site without initial preparation of various mixtures to be further processed.

3 Claims, 4 Drawing Figures

VOLATILE LIQUID SUPPLY EQUIPMENT AND PROCESSES AND APPARATUS FOR INTRODUCING VOLATILE CROSS-LINKING AGENTS INTO POLYOLEFIN COMPOUNDS AND FOR THE EXTRUSION OF CROSS-LINKING POLYOLEFIN COMPOUNDS

This is a division of application Ser. No. 851,953, filed Nov. 16, 1977, now U.S. Pat. No. 4,198,374, which issued Apr. 15, 1980.

This invention relates to volatile liquid injection systems and to processes and apparatus for the preparation of plastomer compounds and more particularly volatile liquid supply equipment and to production processes and apparatus for introducing volatile cross-linking agents which may be flammable into cross-linkable polyolefin compounds and for the continuous extrusion of cross-linkable polyolefin compounds with a maintenance of safe operating conditions.

The cross-linking processes associated with plastomer compounds from polyolefin polymers such as polyethylenes or the like is well known and is disclosed in U.S. Pat. No. 2,628,214 entitled Curing of Polyethylenes as issued to Pickney and Wiley on Feb. 10, 1953 and U.S. Pat. No. 2,528,523 entitled Process For Extruding And Insolubilizing Polymers of Ethylene as issued to R. E. Kent on Nov. 7, 1950. Typically, these processes provide for the introduction of organic peroxides by curing at elevated temperatures, on the order of 160° to 250° C., under pressure and result in products which are highly advantageous and may be employed to form insulating or semiconductive layers for cable and the like if the same are produced with extruders. Polyolefin compounds prepared according to the teachings of the prior art were required to be prepared so that the same could accept the cross-linking agent, a protective agent, and any filler materials to be employed in a suitable mixture within a well defined, narrow temperature zone. This zone, for example, in the case of a low density polyethylene and under favorable mixing conditions, would be located between 105° and 135° C. The higher temperature within this range is dictated by the cross-linking agent while the lower temperature is mandated, in the case of polyethylene, by the viscosity of the matter in its molten state. The compounds thus prepared would then be cross-linked at the extruder output by passing directly into a chamber under pressure of water vapor or super heated water at elevated temperatures of approximately 180° to 250° C. Alternatively, introduction of the cross-linking agent could occur within the extruder screw output zone just prior to a penetration of the mixture into the extruder head; however, mixing here occurs within a zone where the polyolefin compound is subjected to very high pressure rendering the introduction of the cross-linking agent highly impractical and resulting in a mixture which is not homogeneous.

In practical application within the industry, the preparatory operations for polyolefin compounds capable of being cross-linked were limited to a choice of organic peroxides which were suitable for the cross-linking of such compounds wherein suitability limited the choice of cross-linking agents to organic compounds displaying low volatility at the temperatures employed during the mixing operations. Therefore, certain highly volatile, flammable, liquid organic peroxides which enjoy current use as cross-linking agents for silicone rubber and other synthetic elastomers could not be practically employed under industrial conditions for the cross-linking of polyolefin compounds and in particular, of polyethylene compounds because of the required high temperatures which occur during processing. This form of exclusion extended to tertiary butyl peroxide or di-t butyl peroxide DTBP, whose boiling point is approximately 110° C. at 760 mm of mercury pressure despite the fact that DTBP is a highly advantageous cross-linking agent because it exhibits cost advantages as well as enabling the fabrication of cross-linked polyethylenes with low photo degradability due to an absence of aromatic cetones. Furthermore, when a liquid peroxide is employed as a cross-linking agent for polyolefin compounds, at ambient temperatures and pressures, the peroxide may be introduced in a single operation at, for example, the extruder input, and avoids the need for prior preparation of the organic compound in the manner described above. In addition, such use of a liquid peroxide permits complete control of the mixing of the ingredients at a single location prior to further processing and results in a highly homogeneous mixture which was not available with prior art techniques.

Therefore, it is an object of this invention to provide processes and apparatus for introducing volatile and/or flammable cross-linking agents into polyolefin compounds.

It is a further object of the instant invention to provide processes and apparatus for the continuous extrusion of cross-linkable polyolefin compounds employing highly volatile cross-linking agents.

It is an additional object of the present invention to provide processes and apparatus enabling the practical use of liquid peroxides as cross-linking agents for polyolefin compounds.

It is another object of the instant invention to provide processes and apparatus for producing cross-linkable polyolefin compounds by mixing volatile cross-linking agents directly at the extruder input while maintaining processing conditions at a safe level which is continuously monitored.

It is an additional object of the present invention to provide apparatus for safely conveying liquid peroxide to a mixing point under conditions where the amount of liquid peroxide conveyed is precisely metered and conditions within the system are constantly monitored to ensure the safe operation thereof.

It is a further object of the present invention to provide processes and apparatus for automatically conveying the peroxide to a mixing point at a rate which is governed by the material processed from that mixing point under conditions where safety conditions are monitored throughout the system and upon failure of a significant condition, the conveying system is automatically shut down and an alarm condition initiated.

Other objects and advantages of the invention will become clear from the following detailed description of an exemplary embodiment thereof and the novel features will be particularly pointed out in connection with the appended claims.

In accordance with an exemplary embodiment of the instant invention, a volatile cross-linking agent such as liquid peroxide is introduced, at ambient temperature and under atmospheric pressure directly into the input of an extruder at the same pressure as the polyolefin compound to be cross-linked, the resulting compounds being put under pressure within the extruder as the temperature increases so that it reaches its definitive shape at the extruder output and may be fed directly into a hot cross-linking enclosure which is maintained under pressure so that the peroxide is incorporated in a single operation permitting complete control of the ingredients mixed and allowing perfect homogenization of the mixture while defusion and consequent loss of the highly volatile peroxide are avoided. The system for introducing the highly volatile cross-linking agent includes a peroxide storage tank, a filling pump, a feed vessel, and incremental feed pump with a pressure gauge, a flow meter and numerous safety features which control the flow, temperature and ambient conditions of the cross-linking agent feed system within a controlled environment to ensure the safe and precise handling of a highly volatile liquid while at the same time controlling the feeding of the liquid as a function of the material processed by the extruder so that the percentage of the cross-linking agent inserted at the input to the extruder remains at a constant, predetermined percentage, regardless of extruder speed variations. Additionally, as shall be seen hereinafter, various additives which are soluble in the volatile cross-linking agent may be introduced within the feed system therefor in sufficient amounts for effecting protection of the resulting polymer without altering the efficiency of the feed system or that of the additive so that the entire process may be carried out at the processing site without initial preparation of various mixtures to be further processed.

Figure 2:
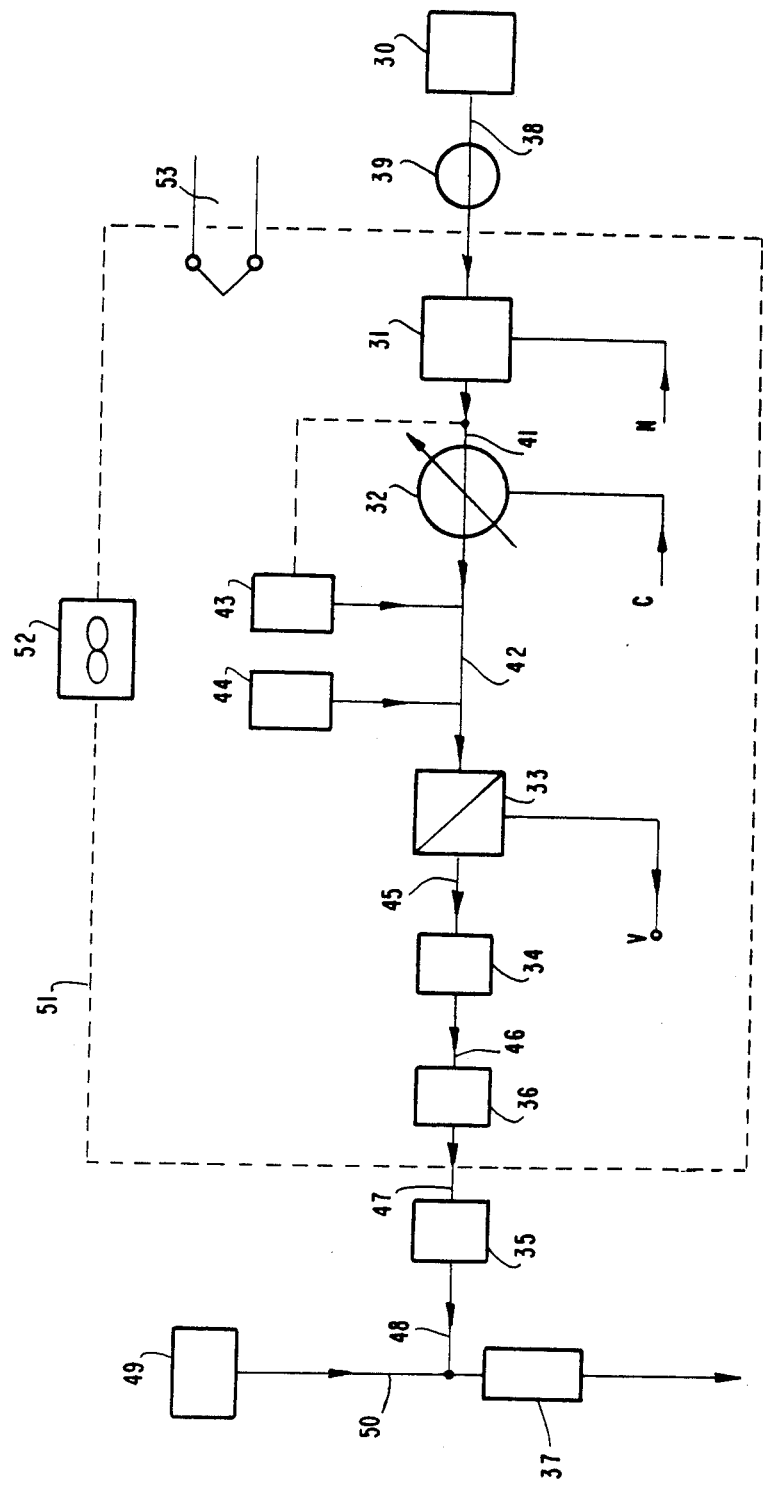
Figure 3A:
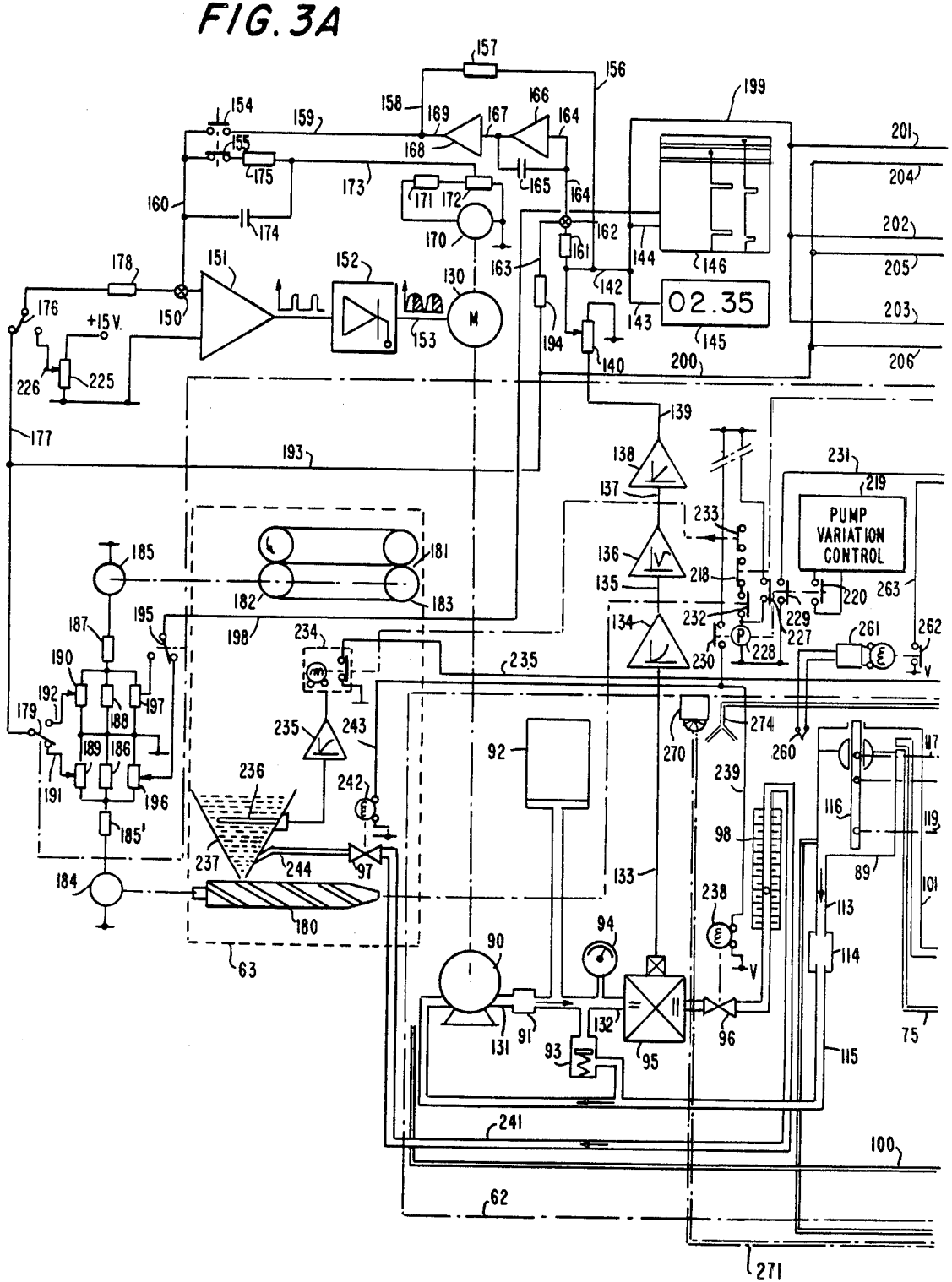
Figure 3B:
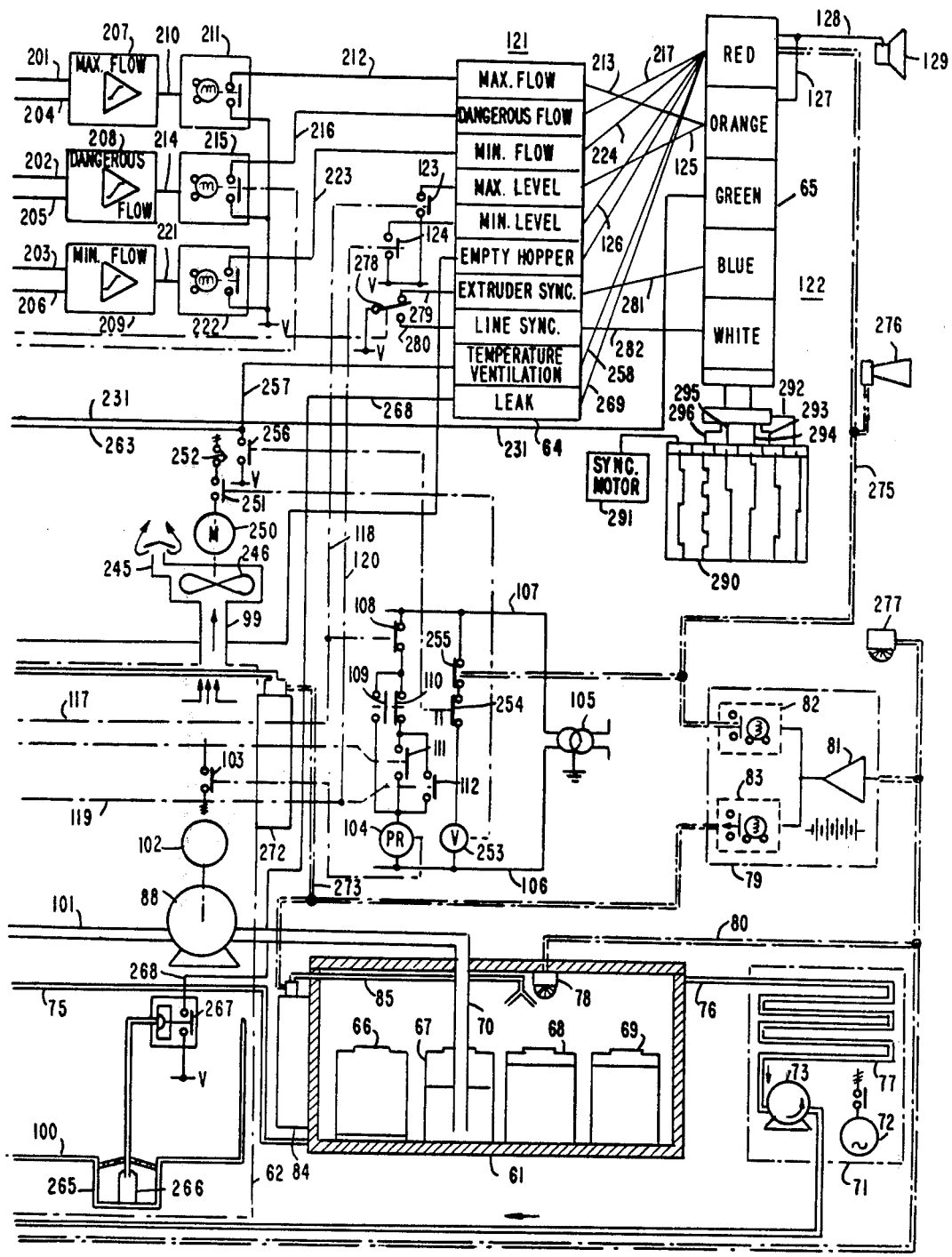

Additional objects of the present invention will be apparent from the operation of the embodiment of the instant invention which is disclosed herein and the operation of the disclosed embodiment of the present invention will be clearly understood from the following description and the accompanying drawings in which:

FIG. 1 is a pictorial view illustrating exemplary continuous extrusion techniques for cross-linkable polyolefin compounds in accordance with the teachings of the present invention together with housings for the volatile cross-linking agent feed system and the electrical control and alarm equipment therefor;

FIG. 2 is a highly generalized block diagram schematically illustrating the details of the volatile cross-linking agent feed system for supplying the volatile cross-linking agent in the manner illustrated in FIG. 1; and FIGS. 3A and 3B depict a schematic diagram illustrating the details of the volatile cross-linking agent feed system and the electrical control and alarm equipment for the exemplary continuous extrusion embodiment of the invention illustrated in FIG. 1. As FIGS. 3A and 3B connect from left to right to depict a single schematic, these figures are frequently referred to in combination as FIG. 3.

Referring now to FIG. 1, there is shown a pictorial view of an exemplary continuous extrusion technique for cross-linkable polyolefin compounds in accordance with the teachings of the present invention together with housings for the volatile cross-linking agent feed system and the electrical control and alarm equipment therefor. The apparatus illustrated in FIG. 1 comprises an electrical control and alarm cabinet 1, a peroxide feed cabinet 2, an extruder 3, and a continuous vulcanization tube 4. The electrical control and alarm cabinet 1, as shall be seen in greater detail in conjunction with FIG. 3 includes all logic, control, alarm, condition indicia, connection terminal boards and other electrical apparatus employed for the control, maintenance and monitor of the peroxide feed system within cabinet 2 while all electrical motors which are disposed within the cabinet per se are of the explosion proof type or are connected to inherently safe supplies. All feed through conduits and connectors intermediate the two cabinets are provided with seal proof gaskets and all electrical connections are made, wherever possible, within terminal boards mounted within the electrical cabinet 1 so that, in essence, all circuitry required for the peroxide feed system is present within electrical cabinet 1 except where the presence of a specific drive or motor system within peroxide feed cabinet 2 is absolutely necessary such as in the case of a motor or the like and under these circumstances such motor is of an explosion proof construction. On the face 5 of the electrical control and alarm cabinet 1 are located a plurality of control, monitoring and alarm indicia to provide an operator with immediate visual appraisal capabilities of the present operation of the system as well as records regarding the past history thereof. In addition, any alarm condition of note is further accompanied by the sounding of a siren or horn so that both the audible and visual senses are stimulated should an alarm condition result. More particularly, the electrical control and alarm cabinet 1 is provided with two sets of visual condition indicating devices 6 & 7 to provide the operator with immediate indications which are advisory of the operational conditions within the system. Although the nature of these indicia will become more apparent in conjunction with FIG. 3, it should here be appreciated that condition indicia 7 may take the form of ten alphameric display panels located in a side by side manner which are selectively illuminated by the system should the condition to which they are assigned occur within the system. Certain of these indicia merely are advisory of normal operating conditions while others are indicative of a condition which will cause system operation to terminate if the same are not quickly corrected. The conditions for which an alphameric display panel is provided within the condition indicia array 7 are as follows:

| Maximum Flow | Empty Hopper |
| --- | --- |
| Dangerous Flow | Extruder Sync |
| Minimum Flow | Line Sync |
| Maximum Level | Heat Rise |
| Minimum Level | Leak |

In addition, the condition indicia 6 comprise a plurality of colored panels which are selectively enabled in conjunction with selected ones of the condition indicia in array 7 to indicate normal operating conditions, abnormal operating conditions or the onset of dangerous conditions which, as will be seen below, are accompanied by a shutting down of the system. The colored panels associated with the condition indicia 6 are normally selectively illuminated in conjunction with the alphameric panels within the condition indicia array 7 so that the operator is apprised both as to the urgency of the condition which has occurred and its precise nature. The condition in dicia 6 may typically comprise five differently colored panels, such as red, orange, green, blue and white wherein the white, blue and green panels are indicative of normal system operation, the orange panel is indicative of an abnormal condition while the red panel is indicative of a dangerous condition which may cause system shut down to occur. Additionally, while the white, blue and green panels will be continuously illuminated during normal forms of operation, the illumination of the orange and red panels occurs on an intermittent or flashing basis and is accompanied by the sounding of a horn, siren or the like. Preferably, the condition indicia 6 are rather large panels and are prominently located on the housing in a manner to be visible throughout an operating area; however, the placement, size and colors for the panels chosen are merely a design choice. The operation and actuation of the condition indicia array 6 and 7 as well as the conditions to which they respond will be described in greater detail in conjunction with FIG. 3.

The face 5 of the electrical control and alarm cabinet 1 is also provided with a digital display 8 and a pair of chart recorders 9 and 10. The digital display takes the form of a flow rate counter providing a digital output which displays the flow rate in liters per hour wherein the measured flow rate corresponds to the flow rate of the liquid peroxide being provided at the output of the peroxide feed cabinet 2. The chart recorder 9 takes the form of a two track analog recorder which maintains a record of both the metered flow and the line or extruder speed, as measured in the manner to be described in conjunction with FIG. 3, so that a history of the system operation with respect to that set is automatically maintained and displayed. Similarly, the chart recorder 10 is a six track event recorder which indicates graphically the time and condition of any system warnings which may have been issued by the system in a manner to be further described in conjunction with FIG. 3.

The face 5 of the electrical control and alarm cabinet 1 is also provided with an hour meter 11 which is used to record the cumulative operating time of a system incremental pump, as shown in FIGS. 2 and 3. Additionally, power On and Off switches 12 and 13 are provided as well as a pair of rate control potentiometers 14 and 15. The power on control switch 13 is a two position, mode control switch which automatically returns to a home position identified with the automatic mode of operation when not held in its second position. This second position is a manual mode or a mode which is independent of the level control employed for protective purposes within the fluid feed vessel, and will be described in detail in conjunction with FIG. 3. In the home or automatic position, the power On switch 13 causes the system operation to be controlled in response to an error signal which is derived from the difference between the actual flow rate of the system and a referenced condition established by a mode control switch 16, also provided on the face 5 of the electrical control and alarm cabinet. The referenced condition is set by the operation of the mode control switch 16 which employs, in a first or start up position the speed of the extruder 3 screw and in the second position employs the product output rate from the continuous vulcanization tube 4 as the reference standard so that, in this manner, the flow rate at which liquid peroxide is injected is made to identically correspond to the rate at which processing is occurring to ensure that a precisely metered amount of liquid peroxide is injected for the rate at which the polyolefin compound is being processed. The electrical control and alarm cabinet 1 is also provided with a lock means to prevent access by unauthorized personnel.

The peroxide feed cabinet 2 as shall be seen in greater detail in connection with FIG. 3 is a ventilated cabinet in which the liquid peroxide is stored which contains all necessary ducts and conduits for conveying precisely metered liquid peroxide to the output thereof at conduit 17. The output 17, as shall be described hereinafter, is connected to the extruder input at the base of the hopper employed to supply cross-linkable polyolefine to the extruder. The front of the peroxide feed cabinet 2 is provided with a float type glass tube 18 which permits the visual monitoring of the actual flow in a manner illustrated in greater detail in connection with FIG. 3. The construction of the peroxide feed cabinet 2 is such that a highly constrained and controlled environment is provided for both the liquid peroxide storage and feed equipment so that safe conditions are maintained or else system shut down is initiated. Thus, the peroxide feed cabinet 2 is ventilated and should proper ventilating action terminate, an abnormal condition is indicated. Similarly, the peroxide fill tank is monitored and should the temperature rise, an abnormal condition is indicated. In addition, feed vessel is refrigerated and ventilation is insured through an under pressure venting system, in a manner well known to those of ordinary skill in the art which is implemented through leak-proof tubing. All feed throughs of conduits and electrical cables utilize seal proof gaskets and any electrical equipment contained within the cabinet is either explosion proof or connected to supplies which are inherently safe. Furthermore, the power levels employed are calculated to avoid arcing and all electrical connections are brought to a terminal board within the electrical control and alarm cabinet 1. Catch basins are additionally provided throughout in case of leaks and leaks are monitored by a sump and a pneumatic level indicator to cause the indication of an abnormal or dangerous condition. The entire peroxide feed cabinet 2 is separate and apart from the electrical control and alarm cabinet 1 and it may be located at a variable distance from the extruder to ensure safety in operation. All parts within the peroxide feed cabinet which come into contact with metered liquids are strictly non-corrosive and neutral with respect to the liquid peroxide being employed and hence should take the form of stainless steel, glass, Teflon, polyethylene or similar types of neutral, non-corrosive tubings. The connecting ducts for the installation are also of stainless steel and heavy metals such as copper, are avoided throughout. A closed cycle refrigeration system is also provided herein and a fire detection system may be provided, if desired, through the installation of ionization chambers for detection of gases emitted through combustion and upon such detection, sensory means may be activated to initiate alarms, and/or subsequent to a delay cause extinguishing gas to be discharged into the chamber. Furthermore, in the case of an external fire hazard, alternate detectors, located on top of the electrical cabinet for the purposes of monitoring the external environment may also be employed to initiate an alarm and the extinguisher. Thus, as shall be seen in greater detail hereinafter, the peroxide feed cabinet 2 is constructed and monitored so that safe operating conditions are maintained throughout or else system operation is terminated.

The extruder 3 may take the conventional form of extruder apparatus having a hopper 19 in which the compound to be cross-linked such as polyolefin is fed. At the base of the hopper, the conduit 17 is connected to directly inject the liquid cross-linking agent, which in the exemplary embodiment has been described as a liquid peroxide, directly into the input of the extruder. In addition, the extruder, takes the conventional form of a hollow outer core 20 with a centrally disposed and rotating extruder screw 21 causing extrusion to occur in the well known manner. Thus it will be seen that granules of the compound to be cross-linked are initially mixed at the input of the extruder are thereafter the increase in temperature and pressure induced by the operation of the extruder will cause a highly homogeneous mixture of the liquid peroxide and polyolefin to occur and to be processed through to the output thereof. Accordingly, it will be appreciated that the initial third of the extruder acts to effectively cause the mixing of the liquidous cross-linking agent and the solidus compound to be cross-linked and thereafter an increase in temperature within the extruder, resulting in temperatures from 100°-140° C., will cause the resulting mixture to assume a highly homogeneous state. The resulting mixture of compounds which occurs from the output of the extruder is introduced into the continuous vulcanization tube 4 wherein the same is disposed about a core and thereafter subjected to elevated temperatures so that actual cross-linking may occur.

More particularly, the continuous vulcanization tube 4 takes the form of a steel tube 22 forming a heating chamber 24 which receives steam or super heated water, under pressure. The input portion of the continuous vulcanization tube 4, is provided with a central opening 26 adapted to accept core material about which an insulating layer of cross-linked polyolefin 23 is to be disposed and an annular conduit portion 28 adapted to receive the output of the extruder screw from the extruder head 25. As will be readily appreciated by those of ordinary skill in the art, the liquidous output mixture from the extruder is continuously disposed about core material as the same is fed into the central opening of the extruder head 25 so that this material is vulcanized in a continuous manner about the core material being fed in the direction indicated by the arrow A. Thereafter, the core thus coated with the extruded mixture is run through the heated zone of the continuous vulcanization tube so that cross-linking of the mixture occurs in the manner indicated on a continuous basis so that continuous processing techniques may be employed throughout. As indicated in FIG. 1, the length of the cross-linking zone is sufficient so that cross-linking of the homogeneous mixture from the output of the extruder can be completed prior to leaving the continuous vulcanization tube 4 and hence, all processing which occurs is carried out on a continuous basis.

As the exemplary embodiment of the instant invention being disclosed in associated with FIG. 1 has presumed that polyolefin compounds are supplied to the hopper 19 and liquid peroxide is injected at a precisely metered flow into the conduit 17 for mixing within the extruder and subsequent continuous vulcanizing about a core 27, it may be assumed that the core 27 comprises electrical cable or conductor means as the resulting compound is a highly advantageous insulator. However, it will be appreciated by those of ordinary skill in the art that any liquid material of a volatile nature may be injected at a precisely metered basis from the output of the peroxide feed cabinet 2 and similarly, any compounds which call for organic peroxides for their cross-linking or vulcanization or any other compounds which require highly volatile cross-linking agents may be employed. Typically, compounds which could be introduced into the hopper means for advantageous combination with organic peroxides for cross-linking or vulcanization are as follows:
polyethylene
ethylene propylene copolymer (EPM)
ethylene propylene diene terpolymer (EPDM)
chloride polyethylene (CM)
chlorosulfone polyethylene (CSM)
tolyethylene polyethylene (CSM)
vinyl acetate ethylene copolymer (EVA)
natural rubber (NR)
polyisoprene (IR)
butadiene styrene rubber (SBR)
polyisobuthylene
silicone rubber
acrylonitrile butadiene rubber (NBR)

Similarly, while an extrusion and vulcanization technique has been employed in the exemplary embodiment for the output of the peroxide feed cabinet 2, any mixing or combining and forming techniques, well known to those of ordinary skill in the art, which may be performed under ambient conditions with either liquid peroxide or highly volatile compounds on a precisely metered basis may be used in combination with the principles of the instant invention.

Referring now to FIG. 2, there is shown a highly generalized schematic illustrating in a highly simplified manner, the techniques employed by the instant invention for precisely metering and controlling the injection of highly volatile cross-linking agent while the maintenance of ambient conditions required for safe operations are rigidly controlled. The apparatus illustrated in FIG. 2 comprises the simplified schematic for the embodiment of the invention illustrated in FIG. 1 and comprises a storage tank 30, feed vessel 31, incremental feed pump 32, output transducer means 33, safety valves 34 and 35, a flow meter 36 and the extruder 37 and with the exception of the extruder 37 each of these elements resides in the main channel of fluid flow. The storage tank 30 may take any conventional form of storage tank capable of holding liquid peroxide or such other highly volatile cross-linking agent as is employed in a given system. In addition to the volatile cross-linking agent, other additives such as certain antioxidants which are soluble by direct addition to liquid peroxide or the like may be present within the storage tank 30 so that the cross-linking agent to be injected already includes such additives as are desired. The antioxidants which may be added may take the form of:
44-thio-bis (6 terbutyl-meta-cresol),
44'-butylidene-bis (6 tert.-butyl.-meta-cresol),
2.6-di-tert.-butyl.-para-cresol,
2.2'-methylene-bis (6 tert.-butyl.-para-cresol) Thiobiphenol These antioxidants can be completely dissolved in peroxide in sufficient proportions for effective protection of the polymer without altering the efficiency of the peroxide or of the antioxidant.

The storage tank 30 is connected through a conduit 38 and a pump 39 to the input of the feed vessel 31. The feed vessel 31 may be provided with a fill control device, represented by the input annotated N. This fill control device may be initiated either by manual or automatic control in a manner to be described more in detail in conjunction with FIG. 3. However, the actual start and stop actions of the pump 39 are initiated by a float switch within the feed vessel 31 which acts magnetically on contacts associated with the power input for the pump 39 in a manner also described in greater detail in connection with FIG. 3. Additionally, the float action within the feed vessel 31 acts to provide a minimum level condition which, acts to initiate indicia advisory that an upcoming product shortage in the feed vessel 31 is about to occur through audible and visual indicia in a manner to be more fully discussed in connection with FIG. 3. Switched contacts are also employed to start and stop the automatic fill while a maximum level sensory condition associated with the float control automatically terminates the automatic or manual filling of the feed vessel 31 and provides an advisory indicative of this condition through both visual and audible indicia. The feed vessel 31 is connected through a conduit 41 to an incremental feed pump 32 which transmits a pulsed stream of peroxide or other cross-linking agent in response to control signals supplied at the input thereto annotated C. The incremental feed pump 32 is actually controlled by the production speed of the product coming out of the continuous vulcanization tube or alternatively by the speed of the screw within the extruder 37 in a manner to be covered in greater detail in connection with FIG. 3. Here, it is sufficient to recognize that a control is provided to compare the actual flow rate of the system which is injecting liquid peroxide or other cross-linking agents and the speed of the extruder screw or the output of the continuous vulcanization tube and the output of this control signal is applied to the incremental feed pump 32 so that the rate of flow is maintained at the precisely metered rate required by the processing operation which is then occurring. The incremental feed pump may be bypassed by a pressure limiting valve 43 connected between the input 41 and output 42 of the incremental feed pump. The pressure limiting valve 43 acts in the well known manner to isolate the input and output to the incremental feed pump 32 whenever the pressure at the output thereof remains below a specified level while breaking down to cause the output to effectively be connected to the input whenever the pressure at the output of the incremental feed pump 32 exceeds such predetermined level. The pressure limiting valve 43 may also be employed as an alarm should the pressure differential which it is designed to measure exceed a predetermined level or alternately, a direct reading gauge may be employed to provide this function as well as a direct display function for the operator. The output of the incremental feed pump which transmits the peroxide as a pulsed stream is further filtered and regulated by a group of hydro-pneumatic dampers 44 which act in the well known manner to smooth and order the stream of peroxide pumped from the output of the incremental feed pump 32.

The output of the incremental feed pump 32 thus smoothed is applied through conduit 42 to the input of an output transducer 33 which acts, in essence, to measure the rate of flow and produce an output signal V representing the flow rate, which is obtained, in a manner to be more fully discussed in connection with FIG. 3. This flow rate signal, as obtained from the output of the output transducer 33, is employed in conjunction with the rate signal developed from the speed of the extruder screw or the material processed at the output of the continuous vulcanization tube 4 to develop the error signal used to control the incremental feed pump 32 and hence the flow rate with which peroxide is run through the system. After the rate of flow is measured by the output transducer 33, the peroxide being pumped is supplied through electrically actuated safety valves 34 and 35 and a flow meter 36 to the input of the extruder 37 through conduits 45–48. The pair of electrical safety valves 34 and 35 are disposed just as the output of the output transducer 33 and at the input to the extruder 37 so that the same may be simultaneously closed off should an emergency or abnormal condition arise to cut off the feeding of peroxide both within the system and at the output thereof so that the flow is immediately terminated at several locations. The flow meter 36 is a glass tube and ball flow meter of the well known variety and corresponds to the flow meter 18 illustrated in FIG. 1 which permits the operator to visually monitor the flow of liquid peroxide within the peroxide feed cabinet 2. The conduit 48, it should be noted essentially corresponds to conduit 17 in FIG. 1 and the input thereto at the extruder 37 corresponds to the input position at the base portion of the hopper. The pair of electrical safety valves 34 and 35 will close either when the incremental pump 32 stops or should the electrical supply be interrupted so that the supply of liquid peroxide to the injection point at the extruder 37 is immediately cut off.

Polyolefin compond or the like is supplied from the hopper 49 which would correspond to the hopper 19 illustrated in FIG. 1 and through a conduit 50 to the input portion of the extruder 37. Thus, the polyolefin compond will enter into the input portion of the extruder 37 at the same time as the cross-linking agent is injected through conduit 48, under ambient temperature and pressure conditions, whereupon the extrusion process and the continuous vulcanization and cross-linking processes described in association with FIG. 1 may take place without any initial preparation of compounds to be subjected to the process and safe operating conditions are maintained throughout because the amount of cross-linking agent is precisely metered to correspond to that required by the rate of processing. All internal parts of the apparatus which come in contact with liquid peroxide or other volatile cross-linking agents which may be employed are made from stainless steel, florosilasomer, polyetrafloroethylene or any other material not sensitive to peroxide or other cross-linking agent action. Furthermore, since these agents tend to be flammable, a plurality of safety devices are added, as shall be described in more detail in connection with FIG. 3 to ensure the safe operation of the cross-linking agent injection system. For instance, the storage tank 30 and the feed vessel 31 are refrigerated while an enclosure 51, as indicated by the dashed block, is provided in the manner shown to maintain the environment of the system within desired parameters. The enclosure 51 is fabricated so as to be leak proof to the cross-linking agents conveyed should leaks or spills developed within the system and it is subjected to a negative pressure by an extractor 52 whose discharge is evacuated through leak proof tubing and sealing arrangements. The extractor 52 may take the form of a conventional under pressure extractor which is a fan type device where in venting to an external environment is accomplished through a sealing arrangement. Additionally, sensory devices responsive to the ventilation control of the extractor 52 and the temperature within the enclosure 51 are provided to initiate alarm conditions should either the ventilation fail or the temperature rise. Furthermore, catch basins (not shown) are provided throughout the enclosure beneath peroxide handling equipment should leaks develop and the catch basins may be provided with fluid level detectors to indicate the presence of a leak and initiate an alarm condition. In addition, all electrical connections are made to a terminal board located outside of the enclosure 51 so as to avoid the possibility of spark ignition.

Referring now to FIGS. 3A and 3B which connect from left to right, referred to generally as FIG. 3, there is shown in great detail a schematic diagram illustrating the details of the volatile cross-linking agent feed or supply system and the electrical control and alarm equipment for the exemplary continuous extrusion embodiment of the invention illustrated in FIG. 1. As should now be apparent to those of ordinary skill in the art, although the exemplary embodiment herein discussed includes an extruder and continuous vulcanization tube for forming a resultant mix of volatile cross-linking agent and polyethylene about a core to form a resultant product, the volatile cross-linking agent supply system according to one aspect of the instant invention may be employed any time it is necessary or desireable to feed precisely metered quantities of a liquid to a given location and the nature of the liquid involved requires extremely rigorous handling requirements. Furthermore, it will be apparent that although a multitude of safety features are included within the instant invention to insure the safe operation of the volatile cross-linking supply system, selected safety features may be added or deleted to meet the requirements of a specific application. As a generalized block diagram of the exemplary embodiment of the present invention was set forth in conjunction with FIG. 2, the description of FIG. 3 will proceed to set forth the details of the schematic diagram illustrated therein as an overview has already been provided in conjunction with FIG. 2. In the description of FIG. 3, initial focus is directed to portions of the supply system associated with the flow of volatile cross-linking agent while control, safety, and metering equipment associated therewith is either described in association with elements which are controlled thereby or in separate sections of this description devoted to such control circuitry.

In essence, the schematic diagram illustrating the details of the volatile cross-linking agent feed or supply system and the electrical control and alarm equipment for the exemplary continuous extrusion embodiment thereof, as illustrated in FIG. 3, comprises a storage facility for liquid cross-linking agent 61, a pumping and metering compartment indicated by the dashed block 62, material and processing equipment indicated by the dashed block 63, display and alarm indicia 64 and 65 and various control, and sensing equipment to be described hereinafter. The storage facility for liquid cross-linking agent is disposed within a separate chamber of the peroxide feed cabinet 2 illustrated in FIG. 1 and is employed to store a small quantity, 100 liter maximum, of cross-linking agent in liquid form. The liquid cross-linking agents selected may typically include:

di-t butyl peroxide (DTBP)
2,5-dimethyl-2,5-di(t-butylperoxy)hexane
2,5-dimethyl-2,5-di(t-butylperoxy)-3-hexyne t-butyl cumyl peroxide
1,1-di(t-butylperoxy)-3,3,5-trimethylcyclohexane
2,2-di(t-butylperoxy)propane
2,2-di(t-butylperoxy)butane or
cumyl hydroperoxide.

The storage of the cross-linking agent within the storage facility 61 is compartmented in flasks as indicated by flasks or vessels 66–69 with liquid cross-linking agent being pumped from the storage facility 61 through a conduit 70. For the conduit 70 shown, an operator would be required to reposition the conduit within a full flask each time a need for a new supply of cross-linking agent was indicated by the minimum level indicia, to be described hereinafter; however, as will be appreciated by those of ordinary skill in the art, branching and valving of a plurality of conduits for the flasks could be provided so that a new supply as well as the substitution of full flasks for empty flasks could be achieved by merely turning a valve and once the flask was isolated from the system, an empty flask could then be replaced. The storage facility for liquid cross-linking agent 61 is an enclosed chamber as indicated and is refrigerated by a closed circuit refrigeration or "lost" water refrigeration system indicated by the dashed block 71. The lost water or closed circuit refrigeration system indicated by the dashed block 71 includes a motor 72 which drives a pump 73 which in turn drives cooling liquid, maintained at a temperature which is below 16° C. through the conduits 74–76 and the heat exchanging portion 77 to cool the storage facility for liquid cross-linking agent 61 in the well known manner. The closed cirucuit refrigeration or lost water refrigeration system indicated by the dashed block 71 may take any conventional form of this well known class of devices or alternatively, any suitable refrigeration system may be employed in its place.

Additionally, for the purposes of protecting the system against an outbreak of fire, a conventional ionization chamber 78 of conventional construction is disposed within the storage facility 61 for the purpose of detecting gases emitted by combustion and to transmit information indicative of this condition to fire indicating means indicated by the dashed block 79 throgh conductor 80. The fire indicating means indicated by the dashed block 79 includes an amplifier 81, an instantaneous operating relay 82 and a delay relay 83. Accordingly, as will be appreciated by those of ordinary skill in the art, whenever a combustion gas is detected by the ionization chamber 78, this signal is conveyed through conductor 80 and amplified by the amplifier 81 in the well known manner to cause a triggering of the instantaneous relay 82 followed by delayed actuation of the relay 83. When the instantaneous relay 82 is triggered in the foregoing manner, as shall be further described above, system ventilation is terminated and a red alarm signal coupled with the actuation of a horn is initiated. Thereafter, when the delayed relay 83 is triggered, the closing of the contacts associated therewith will cause flask 84, to be opened whereupon fire extinguishing gases as contained therein are conveyed through conduit 85 to extinguish any fire which may be in the process of occurring within the storage facility for liquid cross-linking agent 61. Accordingly, it will be appreciated that the storage facility for liquid cross-linking agent 61 comprises an essentially sealed storage facility which is refrigerated to maintain the volatile cross-linking agent in a cooled condition and is provided with an independent fire detection and extinguishing system so as not only to be isolated from its environment but additionally to be self-protected. Alternatively, solid peroxide or other cross-linking agents in solidus form may be employed within the storage facility for liquid cross-linking agent 61; however, under these conditions, it would be necessary to provide for the controlled heating of the container and ducting so that the environment established within the chamber is set to maintain the peroxide in its liquid state into which it would be first rendered through a melting process.

The pumping and metering compartment indicated by the dashed block 62 comprises a fill pump 88, a feed vessel 89, metering pump 90, hydropneumatic dampers 91 and 92, a pressure limiting valve 93, a pressure gauge 94, a flow transducer 95, electric safety valves 96 and 97, a flow meter 98, negative pressure venting means 90 and catch basin means 100. The fill pump 88 may comprise a conventional pump which is employed to draw liquid cross-linking agent from the storage facility 61 through conduit 70 to the feed vessel 89 through the conduit 101. The fill pump 88 is driven as indicated by conventional motor means 102 which either may be located within the pumping and metering compartment 62 if the same is of an explosion proof design or may be disposed without the pumping and metering compartment and merely connected through a drive shaft or the like to the fill pump loaded therein. The motor means 102 which may comprise either conventional AC or DC motor means is energized through a set of contacts 103 to a conventional power supply (not shown). Both the set of contacts 103 and the power supply would be located outside of the pumping and metering compartment 62 and preferably within the electrical control and alarm cabinet 1 as shown in FIG. 1. Accordingly, as will be appreciated by those of ordinary skill in the art, the motor means 102 is energized to cause cross-linking agent to be pumped through conduits 70 and 102 into the feed vessel 89 whenever the contact set 103 is in a closed condition.

The contact set 103 which acts to cause the fill pump 88 to be energized in the foregoing manner is controlled by the condition of the pump relay 104 which is conventional and acts to close contact set 103 whenever potential is applied thereacross from the potential supply 105. The potential supply 105 may comprise any conventional AC source of potential or alternatively a DC source may be employed if this form of relay is preferred. The potential supply 105 is directly connected to one side of the pump relay 104 through conductor 106 and to the other side thereof through conductor 107 and the combination of switches 108 and 109, 108, 110 and 111 or 108, 110 and 112 whichever group of switches is in a closed condition to establish the serial path to the pump relay 104. Of course, should no serial path be established to connect relay 104 to conductor 107, the relay will be in a de-energized state whereupon switch contacts 103 will be in an opened condition and the fill pump 88 will be inoperative. The switches 108, 111, and 112 are controlled as a function of the level in the feed vessel 89 in a manner to be described below and hence it is here sufficient to appreciate that switch 108 is opened to indicate a safe maximum level condition and terminates the operation of the fill pump 88 while conversely, switch 112 is actuated to indicate a minimum level within the feed vessel 89 and hence indicates a condition associated with an eminent lack of cross-linking agent in the flask presently being employed within the storage facility for liquid cross-linking agent 61. The opening of contacts 112 will not, however, stop the action of the fill pump 88 as no danger results when the system runs out of fluid and warning devices which are provided are sufficient to apprise an operator to immediately correct the condition. In similar manner, the contacts 111 are in a closed condition when a normal level resides within feed vessel 89 and an opening of this set of contacts will not result in pump termination so long as the minimum level associated with contact set 112 has not also been exceeded. This means, as will be readily appreciated by those of ordinary skill in the art that an overlap may be established between the normal level indicated by contacts 111 and the safe minimum level indicated by contact set 112 so that an operator is warned to input more cross-linking agent into the storage facility for liquid cross-linking agent prior to actual termination of the operation of the fill pump 88.

The switches 109 and 110 comprise a ganged pair of switches which are biased to the condition shown. The closed condition of switch 110 is definitive of the automatic mode of operation of the system which is implemented whenever an operator depresses the Power ON button at the electrical cabinet. During the automatic mode of operation it will be appreciated that the minimum and normal level controls associated with switches 111 and 112 are operative. However, for cases where the system must be serviced, a push button associated with contacts 109 is provided within the electrical control and alarm cabinet 1 which will energize relay 104 and cause the pump to be driven regardless of the condition of switches 111 and 112 so long as the push button is held depressed to overcome the normal biased condition of the ganged set of contacts 109 and 110. It should however be noticed that the maximum level condition associated with contacts 108 is always operative as it would be undesireable to let even a repairman initiate a set of conditions where the feed vessel 89 could overflow.

The feed vessel 89 is adapted to receive pumped cross-linking agent through conduit 101 in the manner indicated and to supply cross-linking agent to the metering pump 90 through conduit 113, the filter 114 and the conduit 115. Within the feed vessel 89 resides a level float 116 which acts in a conventional manner to magnetically actuate respective ones of the switch contacts 108, 111 and 112 and thus to control the action of the fill pump 88 in the manner described above and hence, control the level within the feed vessel 89. It should be noted that whenever either the maximum level condition associated with switch 108 or the minimum level condition associated with switch 112 are actuated, appropriate ones of the condition indicia 6 and 7 shown in FIG. 1 are initiated. More particularly, as shown by the dashed lines 117–120, appropriate condition indicia as depicted by the condition indicia arrays 121 and 122 illustrated in FIGS. 3A and 3B are energized. Thus, whenever a maximum level condition is indicated magnetically by the level float 116 and switch 108 is opened, the contact set 123 is closed to illuminate the maximum level alphameric panel indicia in the condition array 121 and as is illustrated by the conductor 125, the orange warning light in condition indicia array 122 is energized. Similarly, whenever a minimum level condition results in the opening of contacts 112, a set of contacts 124 are also closed to cause the minimum level condition indicia in condition indicia array 121 to be illuminated and as is also indicated by the conductor 126 to cause the red warning condition indicia in array 122 to be illuminated. Furthermore, as indicated by the conductors 127 and 128, whenever either the red or orange condition indicia are illuminated, a horn 129 is also sounded to additionally solicit an operator's attention. The feed vessel 89 is additionally refrigerated in the same manner as the storage facility for liquid cross-linking agent 61 by the closed circuit refrigeration or lost water refrigeration system 71 through the winding of the conduits 74 and 75 therearound in a serpentine fashion. Alternatively, if liquified peroxide developed from solid peroxide was being supplied to the feed vessel the feed vessel could be heated in the same manner, described above, for the storage facility for liquid cross-linking agent 61. Fluid may be drawn from the feed vessel 89 by the metering pump 90 through conduits 113 and 115 and the filter 114.

The metering pump 90 may take the conventional form of an incremental pump which is driven by the motor 130 disposed outside the pumping and metering compartment 62. The speed with which the motor drives the incremental pump 90 will be discussed in greater detail below, however, at this juncture in the specification, it is sufficient to appreciate that the speed of the metering pump is closely controlled by an error signal so that precisely the right amount of cross-linking agent is injected into the base of the hopper for the rate in which processing is occurring wherein both flow rate and processing rate can be measured in several fashions. The output of the metering pump 90 in the form of a pulsed flow whose rate is a function of the speed with which the motor 130 is being driven is suppliéd to the conduit 131 for application to flow transducer 95.

The pulsed flow applied to the conduit by the incremental metering pump 90 is smoothed by a series of hydropneumatic dampers 91 and 92 which may be conventional and act in the well known manner to regulate the flow due to the pressure regulating effect of the air or other media therein on the fluid levels which are also present therein. In addition, the metering pump is protected by a pressure limiting valve 93 which may also be conventional and acts in the well known manner to connect the output of the pump to its input to thus release the pressure in the exit line whenever the pressure in the line exceeds the pressure to which the same is set through a spring or other biasing means. The pressure in the exit line 131 is also directly measured by a pressure gauge 94 to further apprise the operator of the functions which are occurring within the system.

The regulated output of the metering pump 90 is thus applied to the input of the flow transducer 95 through conduits 131 and 132. The flow transducer 95 may take the form of a conventional differential flow meter or alternatively, a magnetic thermic or ultrasonic flow meter could be employed. In the case of a differential flow meter, the relationship between the pressure being proportional to the square of the flow rate is employed to generate a signal on conductor 133 which is thus proportional to the square of the flow rate.

The signal on conductor 133 as developed as a function of the square of the flow rate through the differential pressure techniques employed by the flow transducer 95 is utilized as a preferred method of determining the flow rate within the system so that the same may be displayed and also used where desired to develop an error signal for controlling the speed of the metering pump motor 130. More particularly the signal representing the square of the flow rate is applied to a linear amplifier 134 which may be conventional and is employed to shape the signal on conductor 133 in the well known manner. The output of the linear amplifier 134 is then applied through conductor 135 to the input of a square root extractor 136 which may take the conventional form of a differentiator or the like. The output of the square root extractor 136 which is a signal which is now directly proportional to the flow rate of fluid being applied to the flow transducer 95 is applied through conductor 137 to the input of a linear amplifier 138 for additional shaping and amplification in the conventional manner. The resulting signal obtained at the output of amplifier 138 is applied to conductor 139 to potentiometer 140, which here acts as a sensitivity adjustment, and is thereafter applied through conductors 141 and 142 to the inputs of a digital display 145 and one input of an analog recorder 146 so that the flow rate thus obtained may be directly displayed to the operator in terms of liters per hour and recorded for reference purposes. The digitial display 145 corresponds to digitial display 8 in FIG. 1 while the analog recorder 146 corresponds to the two track analog recorder 9 as also shown in FIG. 1.

The flow rate signal obtained from the output of potentiometer 140 on conductor 141 is a negative signal representing the flow rate and is employed, after suitable manipulation, to develop an error signal from summing point 150, under conditions where actual flow rate is being utilized to develop the error signal. Once the error signal is developed at summing point 150, it is applied to a conventional differential amplifier 151 and athyristor bridge 152, which also may be conventional, so that a drive signal proportional to the error signal is applied through conductor 153 to control the speed of the metering pump motor 130 and hence the flow rate through the system as determined by the speed of the incremental metering pump 90. More particularly, when flow rate is to be employed in the development of an error signal, which is the automatic mode set at the console to be distinguished from the manual mode, the switch 154 is in a closed condition while the switch 155 is in an opened condition, i.e., opposite to that illustrated in FIGS. 3A and 3B. Under these conditions, the negative flow rate signal developed as a negative level from the output of potentiometer 140 on conductor 141 is applied through conductors 142 and 156, a resistor 157, conductors 158 and 159, the closed switch 154 and the conductor 160 directly to the summing point 150. In addition, the negative flow rate signal on conductor 141 is applied through a resistor 161 to a summing point 162 where it is combined with a positive signal representing, as shall be seen below, either the rate at which completed material is being processed or the speed of the extruder screw so that a measure of the processing rate is effectively applied through conductor 163 to the summing point 162. Accordingly, the output of the summing point 162 on the conductor 164 represents a system error signal which is then applied to the integrator formed by the capacitor 165 and the operation amplifier 166. The error signal is thus integrated and inverted in the well known manner and thereafter applied through conductor 167 to the input of the inverting amplifier 168. The correction signal thus obtained at the output of the inverting amplifier 168 is applied to conductor 169 where it is algebraically summed with the negative flow rate signal on conductor 158 whereupon the resulting signal is applied through conductors 159, the closed switch 154 and conductor 160 to the summing point 150 where an additional component signal is added to the modified flow rate signal applied to conductor 160 under this set of conditions. More particularly, a tachometer generator 170 is connected in the conventional manner to measure the speed of the motor 130 and develops a negative signal proportional to the speed thereof. This signal is then applied through a voltage divider formed by resistors 171 and 172 to the conductor 173. As the switch 155 is in an opened condition due to the automatic mode of operation set by the operator wherein actual flow rate measured by the flow transducer 95 is employed in developing an error signal, only the AC portion of this signal is applied through capacitor 174 to the summing point 150 as a damping signal for the resulting signal applied on conductor 160. Thus it will be seen that when actual flow rate is being employed in developing an error signal at the summing point 150, the actual flow rate is measured by the flow rate transducer 95 and displayed at the digital display 145 whereupon this signal through conductor 156, resistor 157 and conductor 158 is summed algebrically with the integral of an error signal developed at summing point 162 and added to a damping signal developed from the output of the tachometer generator 170 whereupon the resulting sum is applied to the summing point 150.

When the automatic mode is established by the operator, the switch 154 is placed in a closed condition while the switch 155 is opened as aforesaid. Additionally, the establishment of this mode places the switch 176 in the condition illustrated in FIGS. 3A and 3B so as to connect a second input of the summing point 150 to conductor 177 through a resistor 178. The conductor 177 is connected to a switch 179 which may be set at the console by the operator and is determinative as to whether the rate at which finished material is processed at the output of the continuous vulcanization tube or the speed of the extruder screw is to be employed as a measure of the rate at which the processing of material in the hopper is being processed. More particularly, if the material processing equipment within the dashed block 63 is considered, it will be seen that the items illustrated within this block include the extruder screw 180 and material pulling equipment 181 which, in the case of the cable making application discussed in association with FIG. 1, would comprise pulling equipment suitable for withdrawing finished cable from the end of the continuous vulcanization chamber at the rate at which the same was being made. Thus, in the case of the extruder screw 180, the speed with which the same would turn would normally be expected to measure the rate in which material was being processed from the hopper while in the case of the material pulling means 181, the rate at which actual cable was being made, in the exemplary embodiment, would be determined by the rotation of the driven wheels thereof indicated by the idler wheels 182 and 183. In actuality, the rate at which the idler wheels 182 and 183 are driven by the pulling of finished cable would constitute the better measure since extruders are notorious for clogging or becoming dirty and hence their rate of rotation will not represent a constant measure as to the amount of material being processed from the hopper without periodic readjustment. However, there are certain circumstances in which this type of measure is desireable such as for initiating the operation and the like.

In each case, a tachometer generator 184 and 185 is employed to measure the speed of the extruder screw or the idler wheels 182 and 183 respectively and the positive DC voltage developed thereby is applied through the voltage dividers formed by the resistors 185 and 186 or 187 and 188 to the inputs of potentiometers 189 and 190. The inputs to the potentiometers 189 and 190 are applied through conductors 191 and 192 to the inputs of the switch 179. Thus it will be seen that depending upon the setting of the switch 179, the voltage level applied through conductor 177, the switch 176 and the resistor 178 to the summing point 150 will be a measure of either the rate at which completed cable is being pulled from the continuous vulcanization chamber or the rate at which the extruder is turning which is an indirect measure of the material being drawn from the hopper.

When this positive signal is algebraically summed with the negative going flow rate signal applied to the summing point 150, it will be seen that the output of the summing point 150 which is applied to the amplifier 151 effectively is an error signal representing the difference between the flow rate and the rate at which processing is occurring measured in one of two selected manners. Thus this signal, when applied to the thyristor bridge 152 will drive the motor for the metering pump 90 at a rate to reduce the error signal to zero and hence cause the rate of fluid flow as governed by the incremental metering pump to correspond to that at which volatile cross-linking agent is being employed for processing. It will be appreciated that when switch 176 is in the condition indicated, the lower input to the differential amplifier 151 is zero and hence the summing point 150 in actuality develops the error signal employed. The processing rate applied to the input to switch 179 is also applied through conductor 193 and resistor 194 to the conductor 163 and hence this rate information is applied to summing point 162 in the manner aforesaid. It should additionally be noted that switch 195 is ganged to switch 179 and hence will receive the output of the voltage divider 185' and 186 or 187 and 188 through potentiometers 196 or 197. These potentiometers are set in substantially the same manner as potentiometers 189 and 190 so that the resulting signal applied to the switch 195 and conductor 198 may also be recorded at the two channel analog recording device 146 so that actual flow rate information is recorded with the rate of material processing measured in the manner elected by the operator. The flow rate signal on conductor 144 and the processing rate information on conductor 193 are additionally applied to conductors 199 and 200, respectively.

The signals on conductors 199 and 200, representing the actual flow rate as measured by the flow transducer 95 and the preset flow rate, established by potentiometers 189 and 190, measured as a function of the processing speed, as elected by the operator through ganged switch 179 are applied through conductors 201–206 to individual ones of threshold comparators 207–209. The threshold comparators 207–209 may take the conventional form of deadband amplifiers which each act to compare on a continuous basis, the magnitude of the error signal as measured between the actual flow rate within the system as established by the signal on conductor 199 and the rate at which material is being processed as present on conductor 200. The settings of each of the threshold comparators 207–209 differ and are associated with specific conditions which must be detected for safety indicia and/or automatic shut down to occur. More particularly the threshold amplifier 207 is associated with a maximum flow condition which is measured by stepping the threshold comparator 207 to a level which is calculated to be 10% above a normal flow condition. Therefore, as will be appreciated by those of ordinary skill in the art, whenever the difference in the signals supplied to conductors 201 and 204 is less than a value which is 10% above normal flow no output is produced by the threshold comparator 207. However, when the difference between these input signals exceed the 10% of normal flow value established, an output level is supplied on conductor 210 which thus triggers the maximum flow relay 211. When the maximum flow relay 211 is triggered, the contact set therein is closed so that an energizing level is applied through conductor 212 to cause the maximum flow indicia within the alphameric indicia array 121 to be energized and in addition thereto, as indicated by the conductor 213, the orange warning indicia is energized in an intermittent or flashing manner and the horn 129, as indicated by conductors 127 and 128, is also enabled. Thus, whenever a maximum flow condition is measured, the maximum flow relay 211 is triggered to initiate a flashing orange alarm and the horn 129 while the appropriate panel within the alphameric display 121 to define the nature of the condition measured is illuminated.

In a similar manner, the threshold comparator 208 is set to measure dangerous flow conditions which are defined as those which exceed a normal flow condition by 50%. Accordingly, the level of the threshold comparator 208 is set to this magnitude and whenever this condition is detected, an output signal is applied to conductor 214 to trigger the dangerous flow relay 215. Whenever the contacts within the dangerous flow relay 215 close, as indicated by the conductors 216 and 217, the dangerous flow alphameric indicia within the indicia array 121 is illuminated and additionally, the red indicia within the array 122 is illuminated on an intermittent or flashing basis together with the horn 129. Thus, the closure of relay 215 which indicates the presence of a dangerous flow condition, initiates the sounding of an alarm in terms of a red flashing light and horn while the appropriate one of the alphameric indicia in array 121 to define this condition is illuminated. In addition, a second set of contacts 218 which are associated with the dangerous flow condition relay 215 are opened to terminate the operation of the metering pump through the control logic associated with the block 219 which is subsequently described. Here, however, it is sufficient to appreciate that the control logic within block 219 enables the metering pump 90 to be driven in the manner described above so long as the contact set 220 associated therewith is in a closed condition; however, whenever the contact set 220 resides in an opened condition, the driving current for the metering pump motor 130 will not be provided thereto. Thus, whenever a dangerous flow condition is detected, the metering pump 90 is stopped and an alarm in the form of a red flashing light and a horn is initiated together with an illumination of the appropriate indicia panel within the alphameric indicia display 121. It should also be noted that the contact set 218 associated with relay 215 or the operation of the pump control logic associated with block 219 may be timed so that upon detection of a dangerous flow condition, the pump is initially stopped for a short interval, such as five (5) seconds, and then is restarted to ascertain if the condition persists; however, should the condition persist, shut down in a final manner may then be initiated.

The threshold comparator 209, as indicated, is associated with a minimum flow condition and hence, this threshold comparator is preset to establish an output signal on conductor 221 when the differential measured between the input signals on conductors 206 and 203 drops below the level corresponding to 10% below normal flow. When this occurs, an output signal is provided on conductor 221 to energize the minimum flow relay 222 and hence, signal a minimum flow condition. When the minimum flow relay 222 is triggered, as indicated by conductors 223 and 224, the minimum flow display indicia within the alphameric display 121 is illuminated together with the illumination of the flashing red panel and the horn 29. Although not shown in FIGS. 3A and 3B, the minimum flow relay 222 may have a second set of contacts associated therewith to stop the action of the metering pump 90 through a disposition of such second set of contacts in much the same manner as the contacts set 218. Alternatively, a timing arrangement could also be employed with this second set of contacts to cause a stopping of the pump after a short interval such as five (5) seconds, if this condition should persist or alternatively, the timing could be achieved by the pump variation control logic indicated by the block 219. Thus, it will be seen that whenever a dangerous flow condition is detected, the metering pump 90 is stopped and an alarm condition is indicated by a flashing red light, the sounding of a horn and the illumination of an alphameric display indicia indicating the condition. Similarly, should a maximum flow condition be detected, a flashing orange light is initiated together with a horn and a display indicia indicating the condition while for minimum flow detection, an alarm in the form of a flashing red light and horn together with an appropriate display panel is issued and the action of the metering pump may be stopped.

Upon a setting of the manual mode control switch by an operator the switch contacts 176 are changed in position to connect with the input to potentiometer 225 through conductor 226. Additionally, as was stated above, the switch 154 is opened while the switch contacts 155 are closed so as to reside in the condition illustrated in FIG. 3 so that manual operation of the pump may be initiated for the purposes of testing or calibration. Additionally, as shall be seen below, switch contacts 227 associated with the relay 228 and the metering pump control logic 219 are closed to effectively by-pass the dangerous flow and other safety feature interlocks so that relay 228 is maintained in an energized condition to thereby retain the contacts 220 of the metering pump control logic closed so that the same can be operative. Although the mode cntrol switch associated with manual and automatic operation has been stated as present on the face of the electrical control cabinet illustrated in FIG. 1, the same may be modified so that manual operation of the pump for testing and calibrating purposes may only be initiated by an opening of the cabinet and the depression of this switch which would then reside therein to insure that only authorized personnel can implement the manual operation of the metering pump 90 for testing or calibration purposes. In the manual mode of operation, associated with the switching of contacts 176 to the input to potentiometer 225 and conductor 226, the metering pump motor 130 is essentially driven from a DC level and feedback representing the speed of the motor per se is employed through feedback techniques to form an error signal from summing point 150. More particularly, when switch 176 is placed in contact with the conductor 226, the 15 volt supply of voltage to the potentiometer 225 is stepped down and applied through conductor 226, the switch 176, and the resistor 178 to the summing point 150. Similarly, the negative signal developed by the tachometer 170 as a function of the speed of the metering pump motor 130 is stepped down through the voltage divider formed by the resistors 171 and 172 and applied through conductor 173, the resistor 175, the switch 155 which is now in a closed condition and the conductor 160 to a second input to the summing point 150. The difference between the positive level from the output of resistor 178 and the negative level on conductor 160, as thus obtained, is applied from the summing point 150 to the differential amplifier 151 whereupon the difference signal is applied to the thyristor bridge 152 and a driving signal for the pump motor 130 is developed therefrom and applied thereto through conductor 153. In this manner, the metering pump motor 130 may be driven for calibration or testing purposes under operator control.

The final element associated with the driving of the metering pump motor 130 is associated with the metering pump variation control logic indicated by the block 219. This logic, when in an operative condition, will close a set of contacts, not shown, to complete the circuit to the input of the metering pump drive motor which resides between the differential amplifier means 151 and the motor 130 wherein any location therein is suitable. Alternatively, the control of the metering pump logic indicated by the block 219 may be associated with a triggering function of the thyristor bridge 152. In any event, the pump variation control logic associated with the block 219 may serve to monitor any functions of the metering pump motor 130 or the metering pump 90 which are deemed desireable and in addition thereto an external set of contacts 220 associated with the metering pump variation control 219 are employed to terminate the action of the metering pump any time an abnormal or dangerous condition occurs within the system. More particularly, the contacts for the metering pump control logic indicated by the block 219 are controlled by a relay 228 which additionally controls the set of contacts indicated as 229 and 230. Thus, when the metering pump relay 228 is in an energized condition, the contacts 220, 229 and 230 are in a closed condition whereupon the pump variation control logic indicated by the rectangle 219 may control the operation of the metering pump motor as aforesaid. Additionally, with contacts 229 in a closed condition, a signal level is applied through conductor 231 to the display indicia array 122 to cause the illumination of a green lamp or panel therein and thus indicate to an operator that a normal operation is occurring. The closure of contacts 230, as shall be seen below, enables electrical safety valves 96 and 97 to be retained in an opened condition where the flow is permitted to pass therethrough in a manner to be described subsequently. The energizing circuit for the relay 228 is supplied through either the contact set 227 or the grouped sets of contacts 218, 232 and 233 to a potential supply which has not been illustrated. The set of contacts 227 are automatically closed, as aforesaid, when manual pump operation is the commanded mode through a switching of the mode switch associated with switch 176 as aforesaid, and whenever this condition persists automatic energization of the relay 228 is initiated together with the operation of the pump. However, during automatic operation, the pump relay 228 is energized through the set of contacts 218, 232 and 233 which all must be in a closed condition for the pump to operate since an opening of any of these switches will cause the relay 228 to open whereupon the contacts 220, 229 and 230 open causing the pump to be disabled, the green light to be extinguished and the electrical safety valves 296 and 297 to be closed. The contact set 218 is controlled by the dangerous flow relay 215, as aforesaid, and hence any time this condition occurs, the pump relay 218 is disabled. Similarly, contact set 232 is in a closed condition only when the extruder screw 180 is operating as the same is driven by a relay which is actuated as a function thereof and hence if at any time during normal operation the extruder screw should jam, the set of contacts 232 will open to shut down the system. Similarly, the contact set 233 which may operate in response to a delay as indicated, is controlled by the condition of the hopper level relay 234 which is driven from the output of a deadband amplifier as a function of a level control 236 within the hopper 237 of the extruder. When the hopper has a sufficient level of compound to be cross-linked therein, a normal level is provided from the level control 236 to the deadband amplifier 235 whereupon no output is provided to the hopper level relay 234. Under these conditions, the delayed contact set 233 remains closed and the pump relay 228 is energized. However, should the level of polyolefin in the hopper drop below a specified amount, an output is produced from the output of the deadband amplifier to energize the hopper level relay 234 and cause the delayed contact set 233 to open and thereby disable the pump motor relay hence the metering pump per se through the opening of switch contacts 220. The level control 236 for the hopper may be a conventional mechanical of capacitive level detection device well known to those of ordinary skill in the art. Accordingly it will be appreciated by those of ordinary skill in the art that the pump motor relay 228 is disabled any time a dangerous flow condition occurs, the level in the hopper 237 becomes too low, or the extruder screw is not turning. This immediately causes the pump motor to be disabled through contact set 220, the green normal operating light to be extinguished through contacts 224 while the electrical safety valves 96 and 97 are closed through the operation of safety relays 238 and 242 in response to the opening of contacts 230.

The description of the pumping and metering compartment 62 set forth above has outlined how cross-linking agent is pumped from the storage facility for liquid cross-linking agent 61 into the feed vessel 89 by the action of the fill pump 88 and the operation of the fill pump 88 is strictly and precisely controlled by levels residing within the feed vessel 89. Thereafter, the manner in which liquid cross-linking agent is drawn from the feed vessel 89 through the conduits 113 and 115 by the metering pump 90 and then supplied, after appropriate smoothing of the pulsed flow, to the flow transducer 95 was described together with the manner in which the speed of the metering pump is controlled as a precise function of the difference between the flow rate within the system and the rate of use of material in processing. A similar description was also provided for the many safety features employed within the system to ensure that a safe flow within the system is maintained. After the flow rate is measured by the flow transducer 95, it is applied through the electric safety valve 96 to the flow meter 98. The electric safety valve 96 may take any of the well known forms of this conventional class of device which functions to convey fluid therethrough only when power is supplied to the actuating relay therefor illustrated as 238. Therefore, as the relay 238 is connected through conductor 239 to the contacts 230 which are controlled by the pump motor relay 228, it will be appreciated that any time power is not applied by the system or the metering pump is disabled, the electric safety valve 96 is immediately closed to close off the flow of liquid cross-linking agent through the system prior to the flow meter 98.

The flow meter 98 may take any conventional form of flow meter but the float type employing a glass tube for visual inspection of the flow is preferred to permit an operator to view the flow on a periodic basis so that not only may its rate be ascertained but its characteristics visually inspected. The flow meter 98 corresponds to the glass tube flow meter illustrated as 18 in FIG. 1. After passage through the flow meter 98, the liquid cross-linking agent being pumped through the system is supplied through conduit 241 through a second electrical safety valve 97. The electrical safety valve 97 may taken the same for as the electrical safety valve 96 described above and the operating relay 242 therefor is energized through conductor 243 and the pump relay contacts 230 in the same manner as was described for the opera relay 238 of the electrical safety valve 96. This means that any time power is not applied to the system or the metering pump is disabled through the action of the pump relay 228, the electrical safety valve 97 is closed. The physical location of the electrical safety valve 97 has been shown outside of the pumping and metering compartment 62; however, its location is preferably just inside this compartment at a location where the peroxide is injected from the cabinet into the base of the extruder. This means that any time the pump operation is terminated, peroxide injection will immediately terminate and virtually no drippings from the cabinet into the hopper base will occur. This has been indicated by the positioning of the electric safety valve 97 at the beginning portion of the injector tube for peroxide in the hopper cabinet. The injector tube 244 corresponds to the conduit 17 shown in FIG. 1 and is positioned to inject liquid cross-linking agent into the base of the hopper.

The pumping and metering compartment indicated by the dashed block 62 is provided with a negative pressure venting means 99 to maintain a pressure therein which is less than atmospheric pressure while to additionally cause the venting of the cabinet. In this manner, any liquid cross-linking agent which should spill or evaporate within the environment of the pumping and metering compartment 62 will be quickly vented to a safe environment. While the negative pressure venting means 99 has been schematically illustrated, it should be noted that seal proof construction is used throughout and that ducting to an external environment carried out through the port includes essentially a one way flow from the interior of the pumping and metering compartments 62 to its external environment. The negative pressure venting means 99 has been illustrated in FIG. 3 as being driven by a fan blade 246 which in turn, is driven by a motor 250 which is located externally with respect to the pumping and metering compartment. The motor 250 is energized through a relay contact set 251 and a current sensing device 252, the potential supply to the motor not being shown. Thus, it will be seen that whenever the relay contact set 251 is in a closed condition, the fan motor 250 will be energized to thus energize the negative pressure venting means 99. The relay contact set 251 is actuated by the condition of the venting relay 252 which is connected across the potential supply 105 directly through conductor 106 and indirectly through relay contact sets 254 and 255 to the conductor 107. Accordingly, it will be appreciated by those of ordinary skill in the art that so long as contact sets 254 and 255 are in a close condition, the venting relay 253 will be energized to close contact set 251 and hence energize the venting motor 250. The contact set 255 is connected as indicated to the instantaneous relay 82 within the fire indicating means 79 and hence this contact is opened by the instantaneous acting relay 82 only when fumes indicating a combustion situation have been indicated. Thus, when such fumes are detected it will be seen that contact set 255 is opened to deenergize the venting relay 253 to cause the contact set 251 to open and hence, deenergize the venting motor 250. Similarly, contact set 254 is energized as a function of the current sensor 252 in the same manner as a relay contact set. Thus, whenever a normal current level is being sensed by the current sensor 254 in well known manner, contact set 254 is energized to energize the venting relay 253 and hence to continue the motor 250 in an energized condition. However, when excess current is sensed by the current sensor 252, the contact set 254 is opened to de-energize the venting relay 253. It will be appreciated by those of ordinary skill in the art that should excess current be sensed by the current sensor 252, the venting motor 250 is operating improperly and hence, appropriate ventilation is not occurring. Therefore, to avoid further damage, the venting relay 253 is opened to disable the motor 250 and an additional contact set 256 is closed. The contact set 256 is connected between a potential supply indicated by the horizontal line and the conductor 257 to the temperature ventilation alphameric indicia within the alphameric indicia display array 121 and throgh the conductor 258 to the red indicia within the warning light array 122. This means that both the temperature ventilation indicia within array 121 will be illuminated together with a flashing red warning light and the horn 129. Accordingly, it will be appreciated that whenever a failure of ventilation occurs, a warning is immediately issued by the system and the ventilation motor 250 is de-energized while should a fire condition any place in the system be detected, de-energization of the venting motor 250 occurs through direct de-energization of the switch contacts 255.

In a similar manner, a heat sensor 260 is disposed within the pumping and metering compartment 62 to monitor the temperature therein. The heat sensor 260 may take the form of a conventional thermal couple or the like and is connected as indicated to energize a relay 261 any time a high temperature condition is detected. Upon energization, the relay 261 closes contact set 262 to connect a supply indicated by the horizontal line annotated V through conductors 263 and 257 to the temperature ventilation indicia within the array 121 and the red warning light within the array 122 to cause both indicia to be illuminated and sound the warning horn 129. Accordingly, it will be appreciated by those of ordinary skill in the art that should either the ventilation fail or an abrupt rise in temperature occur within the pumping and metering compartment 62, a warning of abnormal conditions is issued to the operator together with the illumination of advisory indicia specifying the precise condition which has caused the warning indicia to be issued.

All parts within the pumping and metering compartment 62 which come in contact with the metered liquid are strictly non-corrosive and neutral in construction with regard to the product being provided and such materials may be made from stainless steel, glass, Teflon, polyethylene, etc. In addition, the connecting ducts for the insulation are also preferably formed of stainless steel and heavy metals such as copper are deliberately avoided. All electrical apparatus contained within the pumping and metering compartment 62 are either of an explosion type design or are inherently safe and the power levels selected are chosen so as to be incapable of arcing. Similarly, all feed throughs of conduits are electric cables utilize leak proof gaskets so the integrity of the environment on either side of the gasket is maintained. Furthermore, a catch basin 100 is positioned within the pumping and metering compartment 62 so as to underlie all components handling metered liquid and hence, serves to prevent the leakage of material out of the container. A sump 265 is provided within the catch basin 100 so that all fluid which has been caught thereby will be collected in the sump whereupon the level thereof may be sensed. More particularly, the sump is provided with a pneumatic or similar level monitor 266 which is arranged to close a set of contacts 267 whenever the level in the sump exceeds a predetermined level. When the contacts 267 are closed, potential is applied from the source indicated as V through conductor 268 to illuminate the alphameric indicia within the alphameric indicia array 121 annotated LEAK. In addition, as indicated by the conductor 269, the red flashing indicia within array 122 is also illuminated to cause a red flashing warning to be issued and a sounding of the horn 129.

Fire detection and correction equipment may also be provided within the pumping and metering compartments 62 through the provision of an ionization chamber 270 therein which acts to detect gases associated with combustion. The ionization chamber 270 may be the same as ionization chamber 78 described above and is connected through conductor 271 to the fire indicating means 79 described above. This means, it will be recalled, acts in response to the detection of a fire condition to immediately terminate the operation of the ventilation system through immediate acting relay 82 and the contact set 255 while acting through the operation of delayed relay 83 to initiate the operation of extinguishing equipment. In the case of the pumping and metering compartment 62, an extinguisher flask 272 is mounted on the side of the pumping and metering compartment 62 as shown and when enabled by the output of the slow acting relay 83 through conductor 273, causes extinguishing fluids to be vented into the system through the conduit 274. It should additionally be noted that any time the immediate acting relay 82 within the fire indicating means 79 is actuated, a signal is supplied thereby through the conductor 275 to cause the red warning indicia within the indicia array 122 to be actuated while a fire horn 276 is additionally actuated. When fire indicating means 79 are employed within the system, additional ionization chambers such as 277 may be disposed about the system to warn of externally developed fire hazards and to cause extinguisher fluid to be supplied to hazardous areas handling metered fluids.

Though not previously described, the switch 179 which acts, as aforesaid, to determine whether the error signal is developed as a function of the speed of the extruder screw or the speed of the actual production line is ganged in the manner indicated to the switch 278 associated with the alphameric indicia display 121. Accordingly, this switch 278 thus defines the mode of synchronization being employed to the alphameric indicia display and accordingly, will couple the voltage source indicated by the horizontal line annotated V to the appropriate one of the conductors 279 or 280 to cause the appropriate indicia, extruder sync or line sync, to be illuminated to thus apprise the operator as to the method of synchronization employed to develop the error signal which controls the speed of the metering pump. When the extruder sync indicia is illuminated, the blue warning indicia within the array 122 is illuminated as indicated by the conductor 281 while when line production synchronization is being employed, as indicated by the conductor 282, the white indicia associated with the array 122 is employed.

An even recorder 290 is also provided so that a continuous record is made of the critical warnings issued as a function of time as well as the modes of operation taking place when such warnings were issued. The timing function is provided by means of a synchronous motor 291 driving the record paper at a speed which is exactly proportional to time. Similarly, the occurrence of the red and orange warnings, regardless of origin, are the critical factors which need be noted in a continuous record of operation and the energized or de-energized condition of the red and orange display indicia within the array 122 may be conveyed through conductors 292 and 293 and recorded on appropriate ones of the tracks of the six track event recorder 290. Similarly, as the nature of the synchronization employed to develop the error signal is defined as a function of either the actuated condition of the blue or white warning lights, the enabled or disabled level thereof may be supplied from the array 122 through conductors 294 and 295 and recorded onto additional independent tracks of the six track event recorder serving as the event recorder 290. Finally, the condition of switch 176 defining either the manual or automatic mode of operation may be gated to the base of the warning light array 122, through means not shown, and conveyed for recording purposes on an additional track of the six track event recorder through the conductor 296. Thus, in this manner, a continuous record is maintained as a function of time by the event recorder which record includes the modes of operation initiated, the type of synchronization employed therewith and the nature of the dangerous conditions which occurred during such operation. Such records may be quite important in further analyzing the operation of the instant embodiment of the invention wherein highly volatile cross-linking agents are supplied from a closely controlled and monitored supply system and injected into the base of an extruder under ambient conditions.

The present invention is viewed as highly advantageous since it permits precisely metered amounts of a liquid agent such as an organic peroxide or any other highly volatile liquid to be injected under ambient conditions for combination with other compounds in a manufacturing process under circumstances which require no preliminary preparation of materials. Furthermore, the supply system proposed is exquisitely configured for the safe handling of highly volatile materials such as volatile cross-linking agents because the metered output thereof is controlled as a function of an error signal developed between the rate at which liquid cross-linking agent is injected and the rate at which the same is being used during processing. This means, that under no conditions will more cross-linking agent be delivered than is effectively being employed so that a dangerous build up of volatile material is avoided. Furthermore, through the provisions of internal monitoring and safety features as well as arranging the fluid conducting components within the pumping and metering cabinet 1 and on an inclined plane upwards towards the output, should any dangerous conditions arise, the cut-off of injected material from the extruder is immediate and also self-imposed by the system. Furthermore, the supply system per se provides an operator with timely warnings so that abnormal conditions which become hazardous may be timely corrected and alarm features calculated to call immediate attention to the condition are employed. Thus, while possible deviations in the metering rate of the liquid injected are constantly monitored and automatically corrected, they are also displayed and recorded so as to be readily available for operator analysis.

The supply system employed also warns of dangerous flow, maximum flow and minimum flow conditions so that flow rates which are either hazardous or improper are immediately called to the attention of the operator and should a hazardous condition exist, the metering pump is terminated to immediately cure the condition. Similarly, maximum and minimum level controls within the feed vessel 89 are monitored so that both overflow conditions and conditions wherein the system is about to run out of cross-linking agent are indicated to the operator while the fill pump 88 is terminated to permit the condition to be corrected. Similarly, in areas where the volatile cross-linking agent are handled per se, venting is provided and monitored while refrigerating techniques with temperature monitoring are also employed to avoid hazardous conditions. In a similar manner, the metering pump which controls injection is interlocked with the operation of the extruder or a similar processing device so that injection is precluded unless processing operations are occurring and the only exception to this is provided in a manual mode of operation which is necessitated for testing and calibration procedures. Electrically operating valving is also provided to ensure immediate cut off of the injected cross-linking agent should power failure or termination of the metering pump arise and combustion detection equipment together with automatic extinguishing equipment may be employed in appropriate portion of the supply system to further reduce the chance of accidental fire or the like. Similarly, the use of the inventive supply system in connection with the extrusion of polyolefin compounds or the like is highly advantageous because using a cross-linking agent in its volatile form in the example cited is much less expensive than forms of the cross-linking agents which are currently employed, does not require special preparation and the combination may be initiated under ambient conditions wherein the extruder per se is employed to mix the same into a homogeneous relationship while cross-linking may be performed on a continuous processing basis.

While the invention has been disclosed in conjunction with a rather specific embodiment which is rendered highly detailed due to the need to show specific safety and monitoring features, it will be appreciated by those of ordinary skill in the art that many variations and alternatives to the specific embodiments set forth may be employed without deviating from the teachings of the instant invention. More particularly, while specific sensors and monitoring techniques are disclosed herein, it will be apparent that alternate forms of sensing or monitoring devices may be employed in association with different forms of monitoring techniques. Furthermore, while a great number of safety and monitoring features were disclosed in conjunction with the supply system for the volatile cross-linking agent disclosed, it will be appreciated by those of ordinary skill in the art that when the supply system is employed for differing types of cross-linking agent or volatile materials, either a greater or lesser number of safety and monitoring features may be utilized depending upon the specific application contemplated and the practical requirements dictated by circumstance. In addition, while the use of the instant supply system in conjunction with an extruder is highly advantageous, it will be seen that direct combination of a volatile agent or cross-linking agent as provided by the supply system may occur in an advantageous manner with other types of processing equipments where the precisely metered output of the instant supply system may be employed to great advantage. Therefore, this aspect of the instant invention should not be viewed as limited to use with an extruder or any of the specific combinations set forth in conjunction with the instant exemplary embodiment.

Accordingly, while the invention has been described in conjunction with a rather specific exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. A method of dispersing and admixing highly volatile, flammable, tertiary butyl peroxide, whose boiling point is approximately 110° C. at 760 mm of mercury pressure, as a cross-linking agent in a polyethylene compound, comprising the steps of:

continuously introducing, at ambient temperatures and under atmospheric pressures, a mass of particulate polyethylene material directly into an input of an extruder;

concurrently injecting at ambient temperatures and under atmospheric pressures, an incremental supply of said liquid peroxide directly into the input of the extruder;

continuously producing a first electrical signal representative of the rate of consumption of the materials passing through the extruder;

continuously producing a second electrical signal representative of the incremental rate at which said liquid peroxide is directly injected into the extruder; and continuously controlling the rate of injection of said liquid peroxide in accordance with the relative magnitudes of said first and second electrical signals, to assure the flow rate at which said liquid peroxide is injected has a substantially constant correspondence to the rate of consumption of the material through the extruder, so that the percentage of said cross-linking agent to said polyethylene compound in the extruder remains at a substantially constant predetermined value, regardless of extruder speed variations.

2. The method of claim 1 wherein said liquid cross-linking agent is mixed by direct addition of a soluble anti-oxidant at the input of the extruder.

3. The method of claim 2 wherein said additive is a phenolic anti-oxidant.

* * * * *